(12) United States Patent
Martin

(10) Patent No.: US 10,244,810 B2
(45) Date of Patent: Apr. 2, 2019

(54) SMART HELMET

(71) Applicant: Donald K Martin, Columbus, OH (US)

(72) Inventor: Donald K Martin, Columbus, OH (US)

( * ) Notice: Subject to any disclaimer, the term of this patent is extended or adjusted under 35 U.S.C. 154(b) by 196 days.

(21) Appl. No.: 15/388,080

(22) Filed: Dec. 22, 2016

(65) Prior Publication Data
US 2017/0295881 A1    Oct. 19, 2017

Related U.S. Application Data

(60) Provisional application No. 62/387,312, filed on Dec. 23, 2015.

(51) Int. Cl.
*A42B 3/04*     (2006.01)
*A42B 3/12*     (2006.01)
*A63B 71/08*    (2006.01)
*G05B 19/048*   (2006.01)

(52) U.S. Cl.
CPC .............. *A42B 3/122* (2013.01); *A42B 3/046* (2013.01); *A63B 71/081* (2013.01); *G05B 19/048* (2013.01); *A63B 2225/62* (2013.01); *G05B 2219/24015* (2013.01); *G05B 2219/24024* (2013.01)

(58) Field of Classification Search
CPC ......... A42B 3/046; A42B 3/121; A42B 3/122; A63B 71/081
See application file for complete search history.

(56) References Cited

U.S. PATENT DOCUMENTS

| | | | | |
|---|---|---|---|---|
| 8,127,373 | B1* | 3/2012 | Fodemski | A42B 3/121 2/410 |
| 9,007,217 | B1* | 4/2015 | Anvari | H04B 1/385 340/540 |
| 9,730,482 | B2* | 8/2017 | Allen | A42B 3/0486 |
| 9,788,588 | B2* | 10/2017 | Allen | A41D 13/018 |
| 2007/0190293 | A1* | 8/2007 | Ferrara | B29C 45/0053 428/166 |
| 2012/0304367 | A1* | 12/2012 | Howard | A42B 3/046 2/413 |
| 2014/0000011 | A1* | 1/2014 | Johnson | A42B 3/121 2/413 |

* cited by examiner

*Primary Examiner* — Ryan A Reis

(57) ABSTRACT

Systems, methods, and devices for protecting a user head are provided. In one example, a computer-implemented method can comprise receiving, by a system operatively coupled to a processor, a set of data detected by one or more sensor embedded within the helmet device. The computer-implemented method can also comprise adjusting, by the system, a pressure condition within a first set of inflatable cells of the helmet device based on the set of data.

20 Claims, 15 Drawing Sheets

SMART HELMET

CROSS REFERENCED TO RELATED APPLICATION

This application claims the benefit of U.S. Patent Application No. 62/387,312, filed Dec. 23, 2015, and entitled "SMART HELMET", the entirety of which application is hereby incorporated by reference herein.

BACKGROUND

The subject disclosure relates to protective equipment and in particular to a protective helmet. Protective equipment may be used by athletes in sports, soldiers in various military branches, professionals in their trade, etc. One area of the body for which protective equipment is used is the head. Protective equipment for the head, such as protective helmets, may be designed to provide varying levels of protection depending on the circumstances surrounding the use. Some factors that can be considered in the design of protective helmets, and protective equipment generally, are the environment of use, the type of injury for which protection is being provided, weight, and appearance among other things.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, apparatuses, and/or computer-implemented methods that facilitate automatically adjusting braking systems of various vehicles.

According to one embodiment, a computer-implemented method can comprise receiving, by a system operatively coupled to a processor, a set of data detected by one or more sensor embedded within the helmet device. Also, a pressure condition within a first set of inflatable cells of the helmet device can be adjusted, by the system, based on the set of data.

According to another embodiment, a system can comprise a gas delivery component configured to adjust a pressure condition within a first set of inflatable cells of a helmet device, wherein a set of valve members of the gas delivery component connect the set of inflatable cells to the gas delivery component. The system can also comprise a control component configured to control the gas delivery system and one or more sensor embedded within the helmet element, wherein the one or more sensor configured to detect a set of data associated with an environment of the helmet device.

According to yet another embodiment, a device comprising a processor coupled to a memory can comprise a helmet element comprising an outer shell layer and an interior protective layer, wherein the interior protective layer comprises a set of inflatable cells. The device can further comprise a gas delivery system configured to adjust a pressure condition within a first subset of inflatable cells of the set of inflatable cells, wherein a set of valve members of the gas delivery system connect the set of inflatable cells to the gas delivery system. Furthermore, the device can comprise a control system configured to control the gas delivery system and one or more sensor embedded within the helmet element, wherein the one or more sensor configured to detect a set of data associated with an environment of the device.

Figure 1:
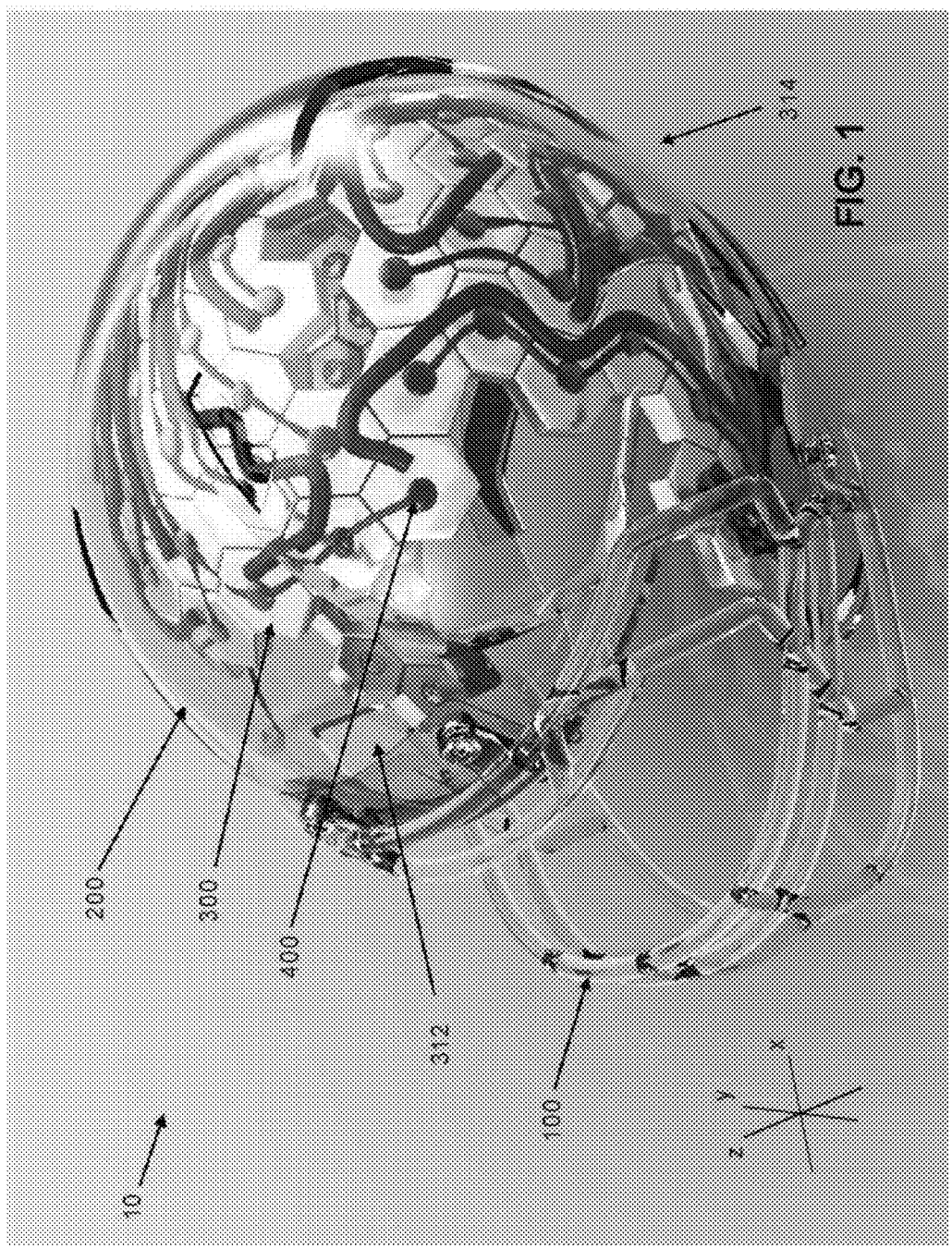
FIG. 1 illustrates a perspective view of a non-limiting example protective helmet in the form of a football helmet. in accordance with one or more embodiments described herein.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to systems, devices, apparatuses, and/or computer-implemented methods that facilitate the protection of a user. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates an exemplary article of protective equipment in the form of a protective helmet (10). The helmet (10) comprises a facemask (100), an outer shell (200), and a protection layer (300). The facemask (100) may be comprised of plastic, metal, or rubber-coated metal. Other materials for the facemask (100) will be apparent to those of ordinary skill in the art in view of the teachings herein. In some versions the facemask (100) may be omitted or replaced with other protective equipment like a face-shield etc. The outer shell (200) may be comprised of one or more plastics and may be constructed in a single layer or multiple layers. In view of the teachings herein, other materials and configurations for the outer shell (200) will be apparent to those of ordinary skill in the art.

Figure 2:
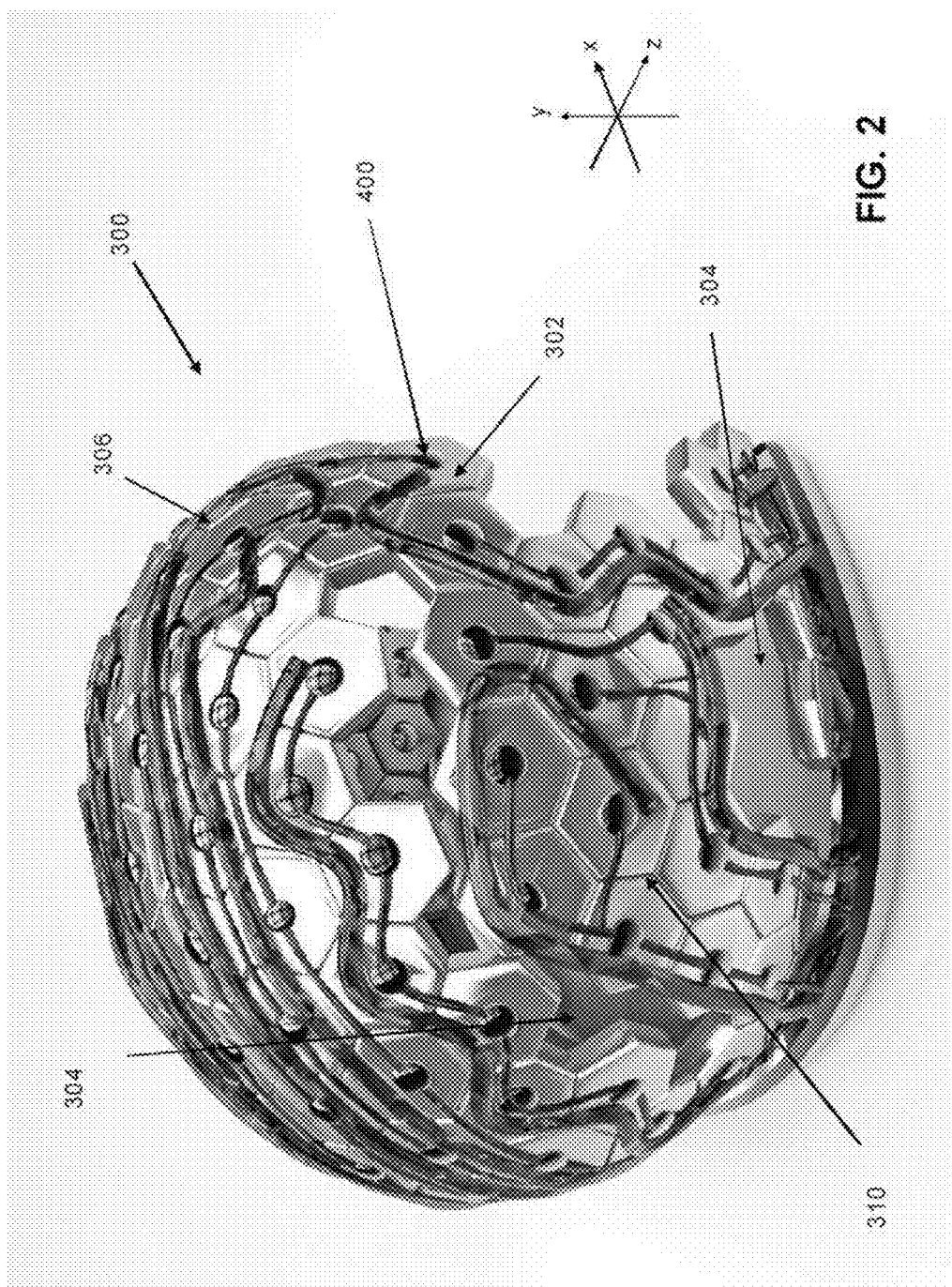
FIG. 2 illustrates a perspective view of the helmet of FIG. 1, shown with an outer shell and facemask removed in accordance with one or more embodiments described herein.
Figure 3:
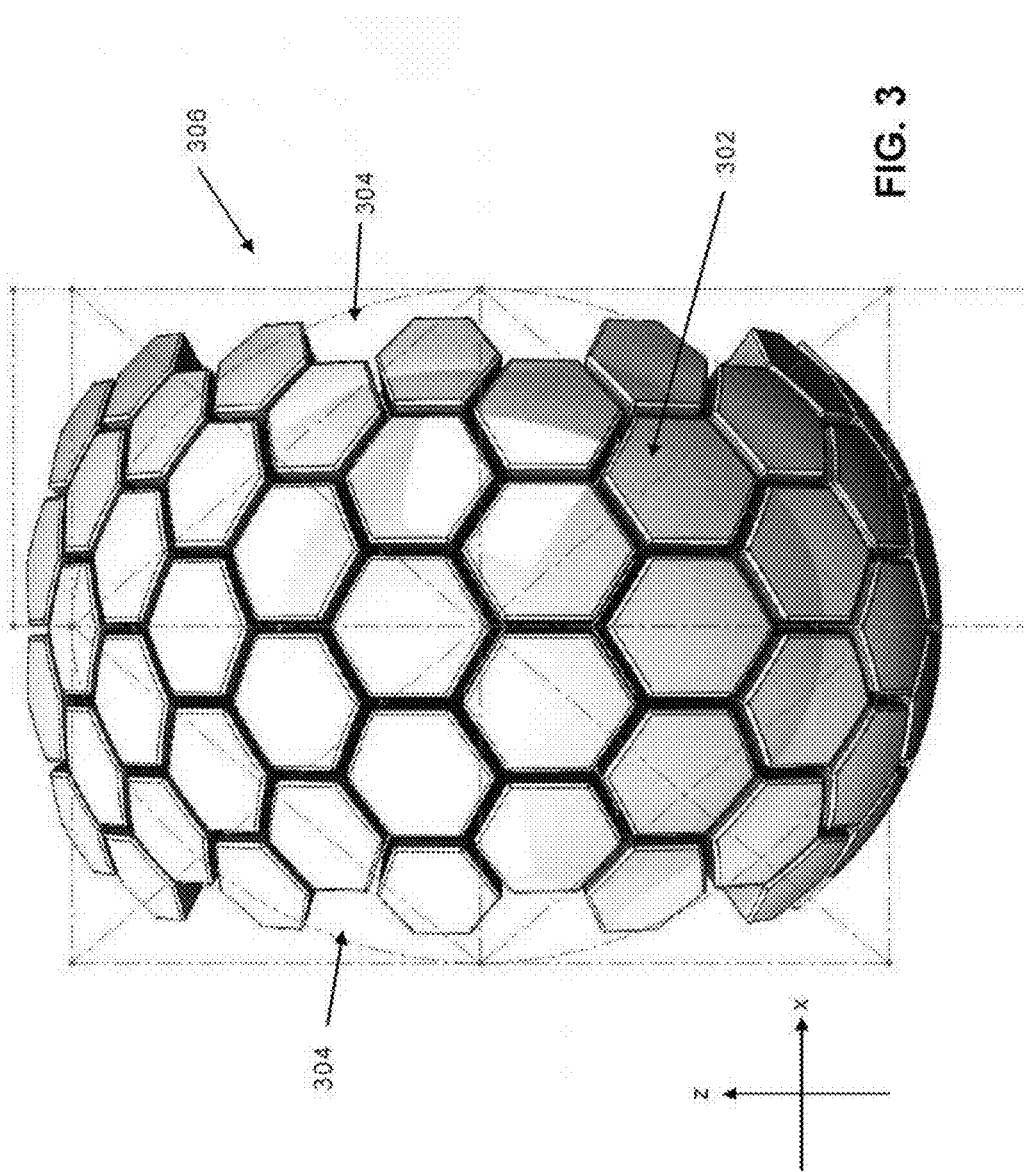
FIG. 3 illustrates a top view of a plurality of cells of the helmet of FIG. 2 in accordance with one or more embodiments described herein.

FIGS. 2 and 3 illustrate the protection layer (300). In the present example, the protection layer (300) is positioned along an interior of the outer shell (200). The protection layer (300) comprises a plurality of cells (302) that have a hexagonal shape. The hexagonal shape for the plurality of cells (302) is not required, and in other versions the shape of the plurality of cells (302) can differ. In the present example, the protection layer (300) comprises openings (304). The openings (304) provide for space between regions defined by the plurality of cells (302). In the present example, the plurality of cells (302) comprises a central region (306), a right region (308), and a left region (310). As shown in the present example, the central region (306) connects with the right region (308) and the left region (310) along a front portion (312) and rear portion (314) of the helmet (10). In some version of the helmet (10), the openings (304) are omitted such that the plurality of cells (302) provides a continuous network for the protection layer (300).

Figure 4:
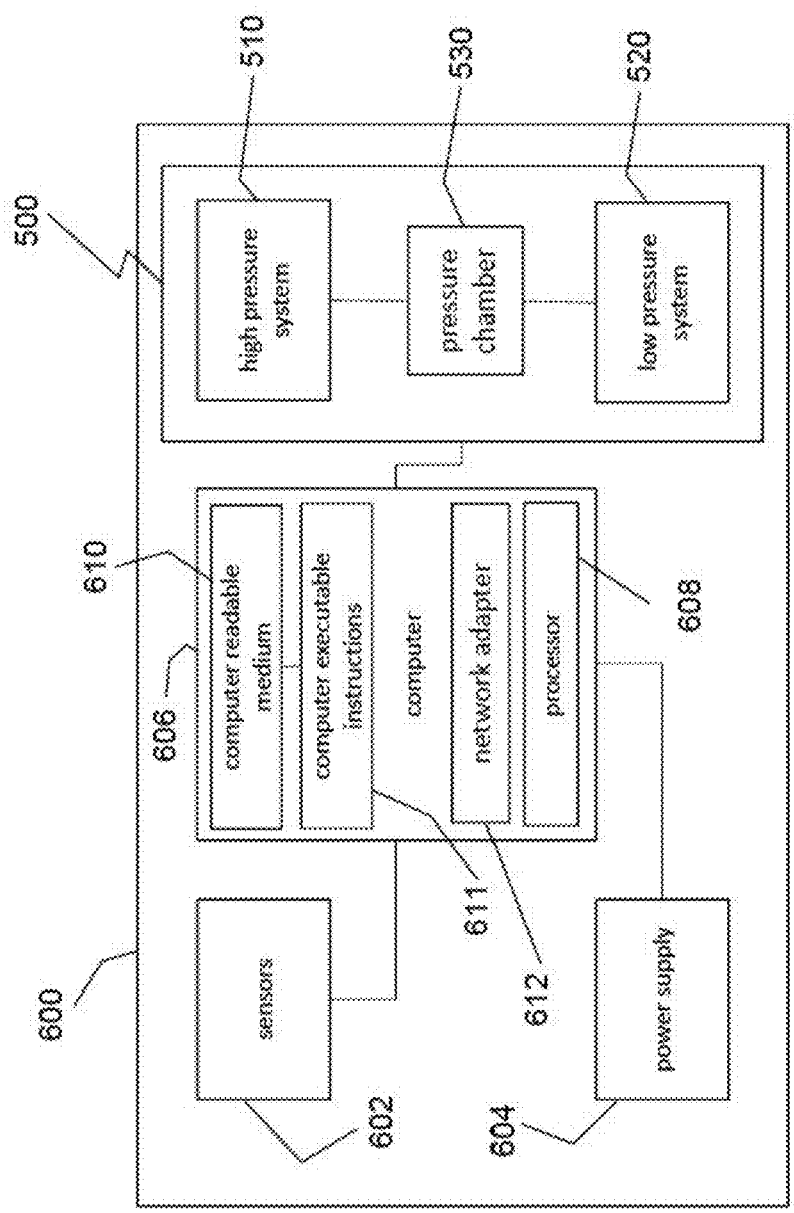
FIG. 4 illustrates a block diagram of a control system of the helmet of FIG. 1 in accordance with one or more embodiments described herein.

FIG. 4 illustrates an exemplary control system (600) for use with the helmet (10). The control system (600) comprises one or more sensors (602), a power supply (604), and a computer (606), which includes a processor (608), a computer readable medium (610), and a network adapter (612). Also illustrated within the control system (600) is a gas delivery system (500) with its high pressure system (510), low pressure system (520), and a pressure chamber (530). The gas delivery system (500) and its components will be described in greater detail below.

In the present example, the sensors (602) are operable to detect motion of surrounding objects. The sensors (602) detect this motion from 360 degrees around the helmet (10). The sensors (602) are configured to provide continuous scanning and detection during an event such as a football game, etc. In one example, the sensors (602) detect motion for surrounding objects such as players in a football game. In doing so, the sensors (602) detect the speed and direction of these objects. In one example, the sensors (602) comprise laser detection and ranging (LADAR) sensors that can be used to detect the motion of objects as well as generate 2D and/or 3D images of those objects for use in other calculations, e.g. mass calculations. The information collected by the sensors (602) is inputted into the computer (606) and calculations can be made using this information as will be described below. In view of the teachings herein, other types of sensors (602) and information detectable by the sensors (602) will be apparent to those of ordinary skill in the art.

The power supply (604) is operable to provide power to the control system (600). For instance, the power supply (604) provides power to the computer (606) as well as the sensors (602) and the gas delivery system (500). In some examples the power supply (604) comprises one or more capacitors. In some other examples the power supply (604) comprises one or more batteries that may be rechargeable or single use. In still other examples more than one type of power supply (604) may be used. The power supply (604) further comprises electrical communication ability such that the power can be transmitted or delivered to the associated components, e.g. the high pressure system (510) and the low pressure system (520). The electrical communication ability in some examples comprises various electrical wiring between and among the components. In view of the teachings herein, those of ordinary skill in the art will appreciate other types of power supply (604) for use with the control system (600) as well as other types and ways of transmitting power from the power supply (604) to the other components.

The computer (606) includes the processor (608), the computer readable medium (610), and the network adapter (612). The computer readable medium (610) is configured to store computer executable instructions (611) that may be used in calculations and control of the sensors (602) and gas delivery system (500) of the helmet (10). The processor (608) is operable to execute the instructions (611) stored on the computer readable medium (610). The network adapter (612) is operable to connect the computer (606) with a network for communication between the computer (606) within the helmet (10) and other locations also connected with the network. In some examples the network may be a local area network (LAN), a wide area network (WAN) such as the Internet, or any other network that will be apparent to those of ordinary skill in the art in view of the teachings herein. The connection to the network via the network adapter (612) occurs wirelessly in the present example, but in other examples the network adapter (612) can instead or in addition use wired connectivity.

In the present example, the computer (606) comprises a soft circuit board construction that is positionable within the helmet (10). In one example the soft circuit board configuration for the computer (606) is positioned in a top inside of the helmet (10). In other examples the computer is not limited to having a soft circuit board construction. In some examples, the soft circuit board may contain the power supply (604), but the power supply (604) may be located separate from the soft circuit board and connect with it through various wiring connections that will be apparent to those of ordinary skill in the art in view of the teachings herein.

Other features that may be included with the helmet (10) include a GPS module that is used to provide location information for each helmet (10). In such an example using GPS modules in the helmets (10), the position information for the helmets (10) can be shared among the helmets (10). In one version this position information can be transmitted among the helmets (10) using the wireless network adapter (612). In other versions, Bluetooth or near field communication (NFC) can be used to share the position information among the helmets (10) in a defined area or range.

Figure 5:
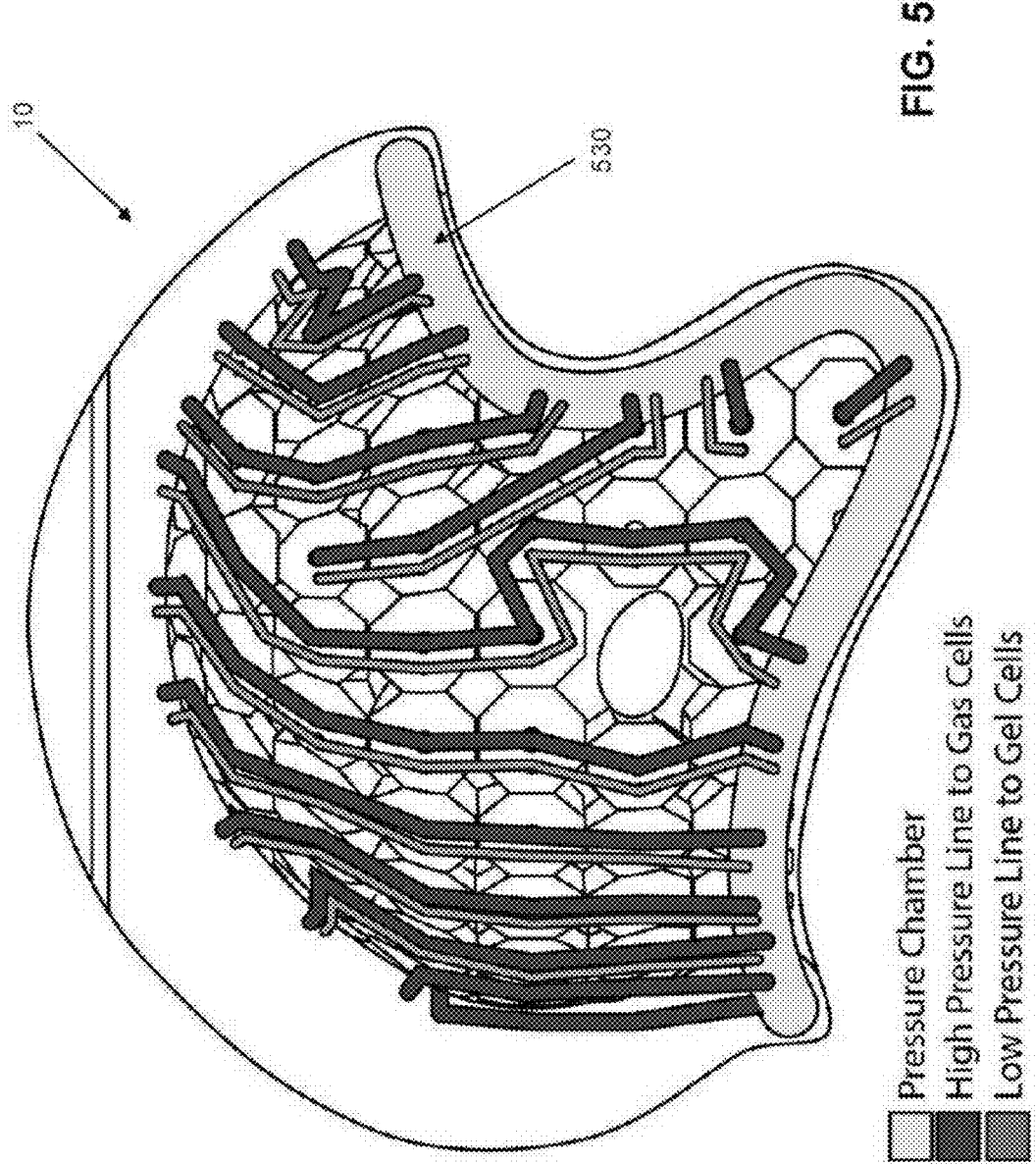
FIG. 5 illustrates a side view of the helmet of FIG. 1, shown with a portion of the outer shell cut away to reveal internal components of the helmet in accordance with one or more embodiments described herein.

As mentioned above, the gas delivery system (500) includes the high pressure system (510), the low pressure system (520), and the pressure chamber (530). The gas delivery system (500) is controlled by the computer (606) to direct calculated volumes of gas to valve assemblies (400) of the plurality of cells (302). In this example, each cell (302) includes a valve assembly (400). Each valve assembly (400) connects with the high pressure system (510) and low pressure system (520). As shown in FIG. 5, the high pressure system (510) and the low pressure system (520) connect with the pressure chamber (530). The gas contained within the pressure chamber (530) is released to portions of the high pressure system (510), the low pressure system (520), or both as directed by the computer (606). In the present example, to control the flow of gas within the gas delivery system (500) and helmet (10) generally, the computer (606) controls a plurality of valves (540) that connect the pressure chamber (530) with the high pressure system (510) and the low pressure system (520).

The configuration of the valves as well as the arrangements for connecting the high pressure system (510) and the low pressure system (520) with the pressure chamber (530) will be described in greater detail below.

Figure 6:
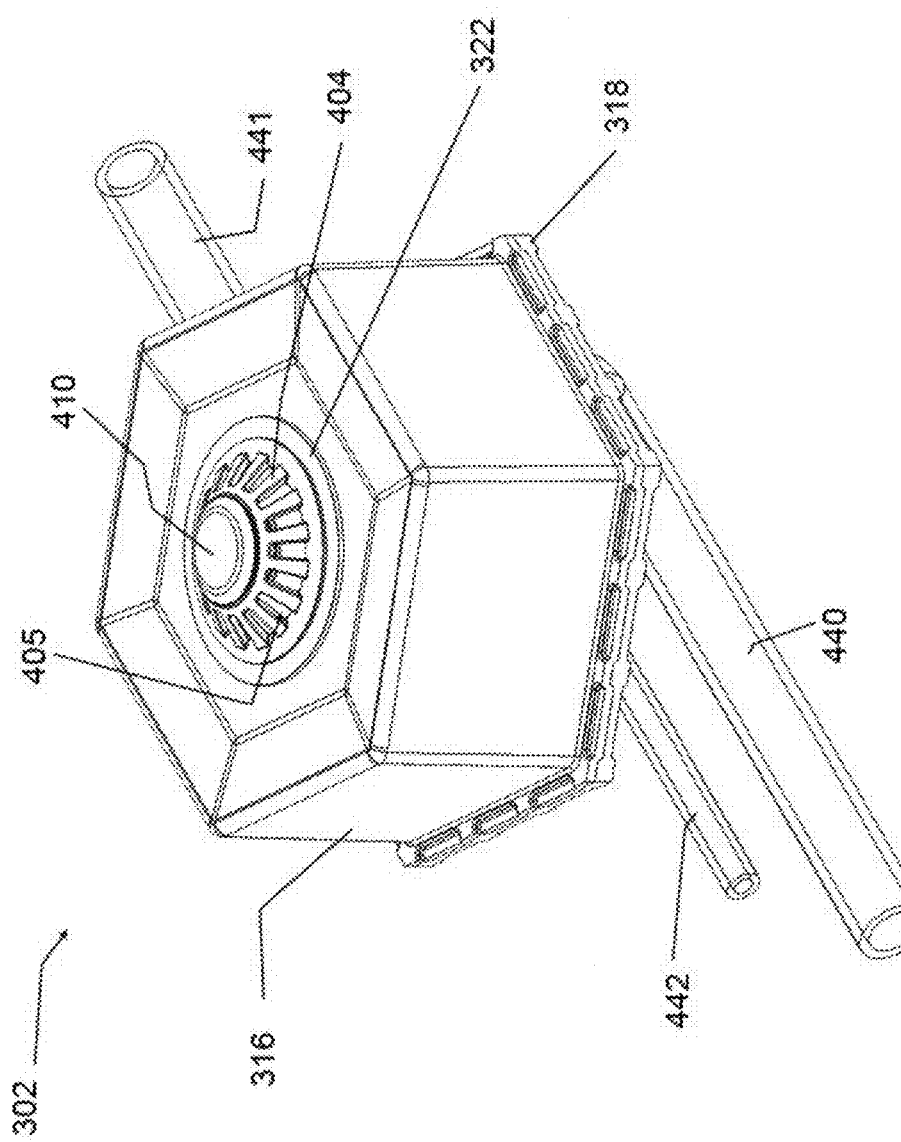
FIG. 6 illustrates a perspective view of one of the plurality of cells of FIG. 3 in accordance with one or more embodiments described herein.
Figure 7:
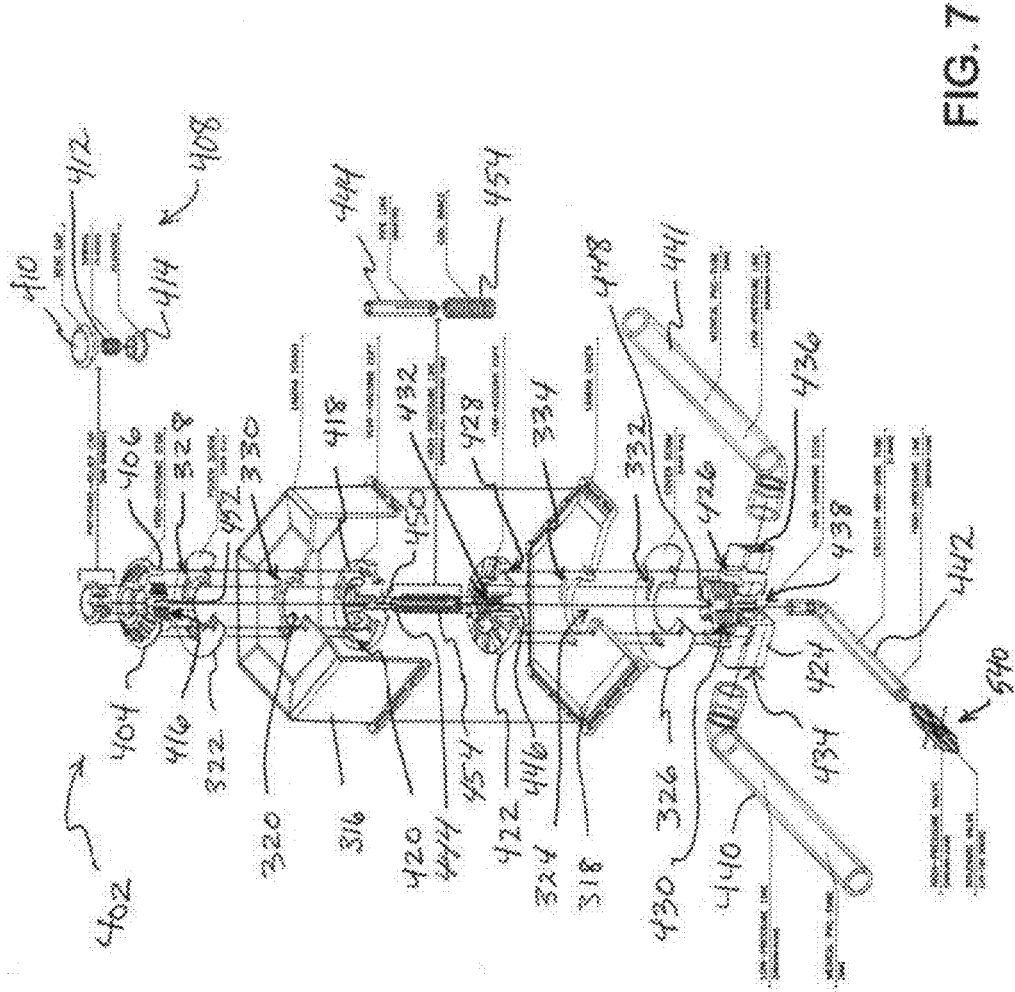
FIG. 7 illustrates an exploded view of the valve assembly of FIG. 6 in accordance with one or more embodiments described herein.

FIGS. 6-9 illustrate views of one of the cells (302) and one of the valve assemblies (400) connected therewith. In the present example each of the cells (302) would have the same or similar structure as that illustrated in FIGS. 6-9. Referring first to FIGS. 6 and 7, each cell (302) comprises a body (316) and a base (318). The body (316) connects with the base (318) such that a hermetic seal is formed between the body (316) and the base (318). At a top surface of the body (316), there is an opening (320) that is configured to connect with a seal (322). The base (318) also includes an opening (324) that is configured to connect with a seal (326). Each seal (322, 326) has respective openings that receive portions of the valve assembly (400). More specifically, at the top surface of the body (316) a vent assembly (402) connects with the seal (322) and body (316).

As viewable in FIG. 7, in the present example the vent assembly (402) includes a stud (404) that has projections (406) that engage with slots (328) of the seal (322) and slots (330) of the body (316). The vent assembly (402) further includes a pressure release assembly (408) comprising a cap (410), spring (412), and plunger (414). The pressure release assembly (408) connects with the stud (404) and is configured to remain closed until a sufficient pressure within a high pressure line (442) is reached at which point the pressure release assembly (408) opens to release gas from within the line (442).

Figure 8:
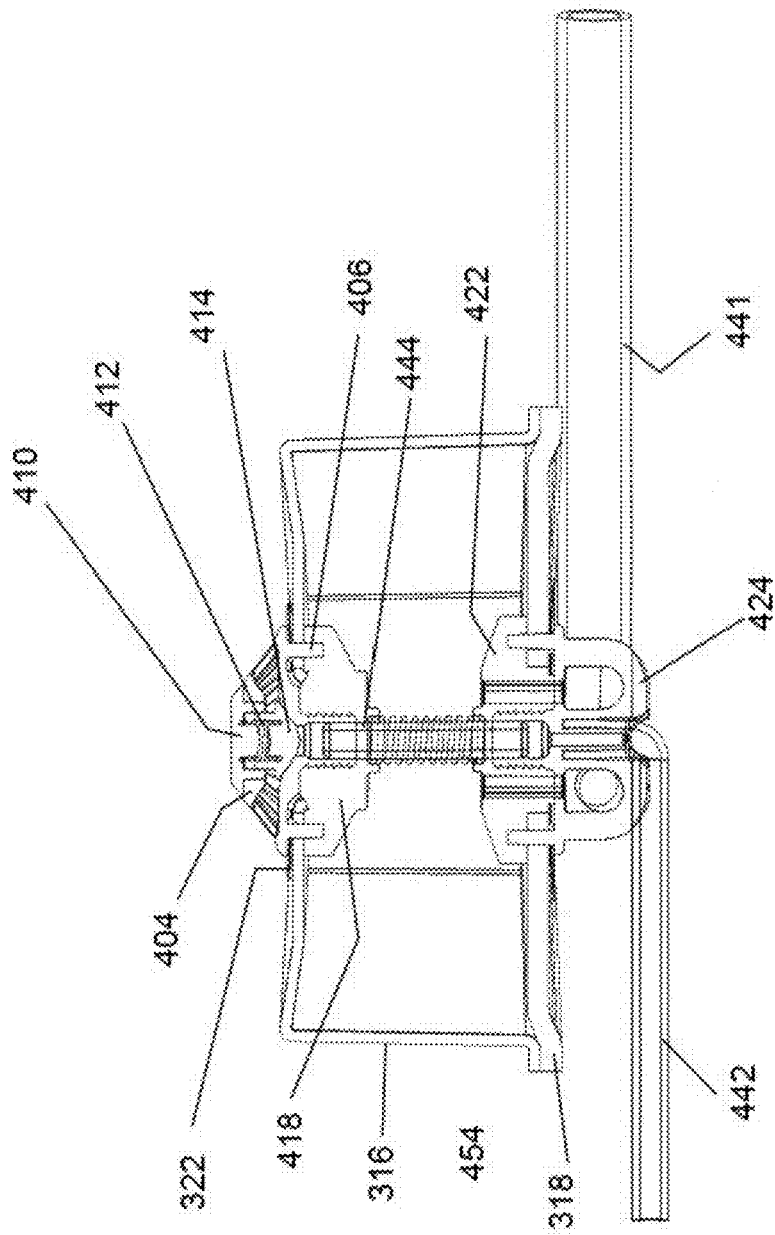
FIG. 8 illustrates a cross section view the cell of FIG. 6, shown in a first position for pressurizing the cell in accordance with one or more embodiments described herein.
Figure 9:
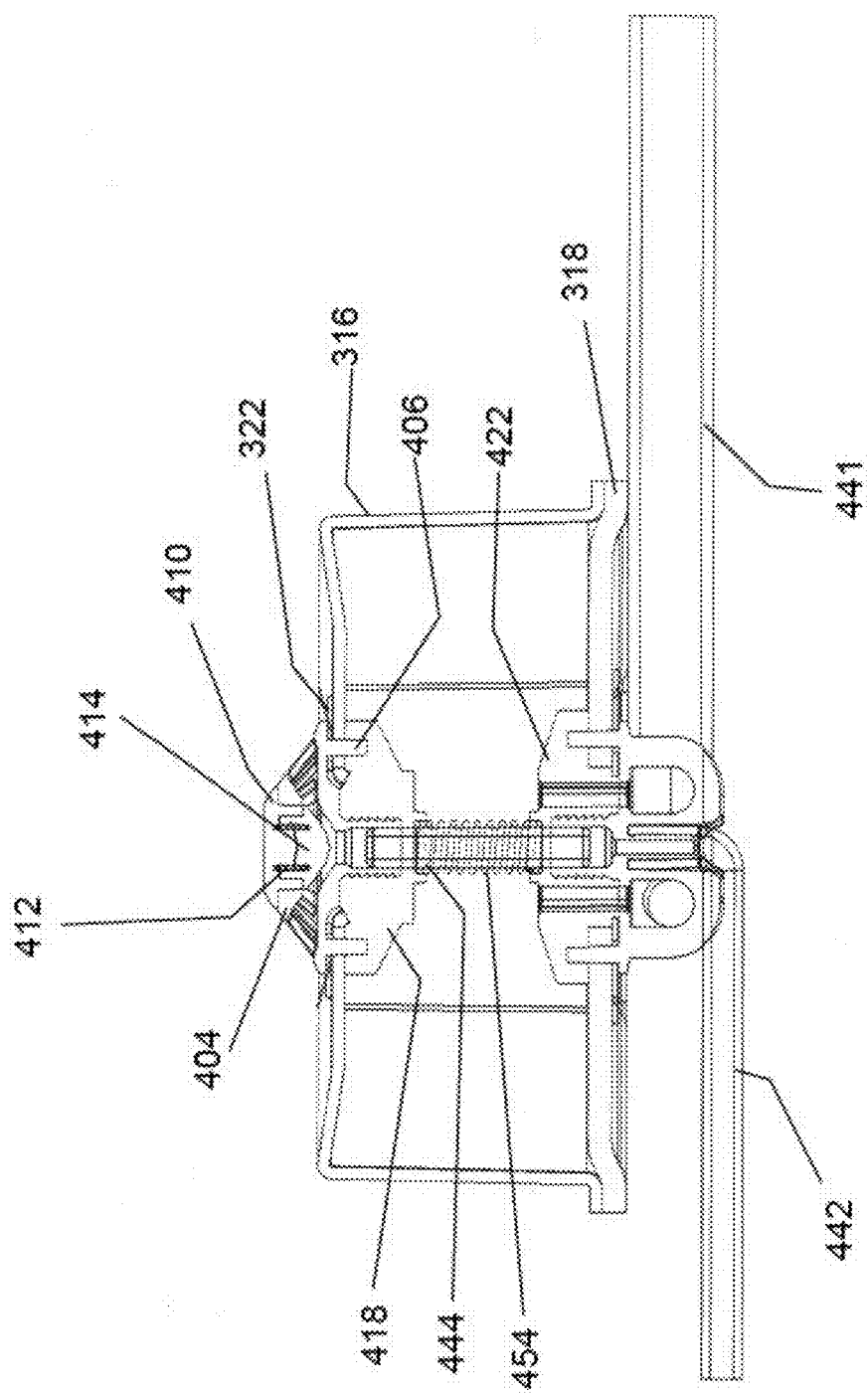
FIG. 9 illustrates a cross section view of the cell of FIG. 6, shown in a second position for releasing pressure from the cell in accordance with one or more embodiments described herein.

FIGS. 8 and 9 depict the plunger (414) in closed and open positions respectively, where the gas is released when the plunger (414) is in the open position of FIG. 9. The stud (404) includes angled slots (405) through which the gas is released from when the plunger (414) is in the open position. The angled slots (405) are configured such that the release of the gas from the valve assembly (400) occurs generally perpendicular to a longitudinal axis defined by the valve assembly (400). In this manner, the gas is released along or generally parallel with the protection layer (300) and thus a user's head. In some other versions, the gas may be released from the pressure release assembly (408) in directions other than generally perpendicular to the longitudinal axis of the valve assembly (400).

The stud (404) of the vent assembly (402) further includes threaded portions (416) along an underside portion of the stud (404). These threaded portions (416) extend through the opening in the seal (322) and through the opening (320) in the body (316). The threaded portions (416) are configured as multiple bores in the stud (404), with the bores having threads along their interior surface. An upper connection member (418) is located within the body (316) and includes threaded portions (419), which threadably connect with the threaded portions (416) of the stud (404). In the present example, the threaded connection between the upper connection member (418) and the stud (404) is such that the threaded portions (416) and the threaded portions (419) engage when the upper connecting member (418) and the stud (404) are pressed together. In this manner the threads and recesses of each of the threaded portions (416) and the threaded portions (419) operate as interlocking teeth or ridges. Furthermore, the connection among the stud (404), the seal (322), the body (316), and the upper connection member (418) creates a hermetic seal.

In this arrangement, the upper connection member (418) is positionable such that it contacts an interior of the upper part of the body (316). The upper connection member (418) further includes slots (420) that are configured to engage with the projections (406) of the stud (404). In some examples, the slots (420) and projections (406) are configured as alignment guides. In some other examples the projections (406) may be resiliently biased and have a hook feature at the end such that the projections (406) to actively engage with the upper connection member (418) to make a more secure connection between the stud (404) and the upper connection member (418). The connection among the stud (404), the seal (322), the body (316), and the upper connection member (418) creates a hermetic seal.

While the present example illustrates multiple mechanical fastening methods to connect the stud (404) with the upper connection member (418), such multiple fastening methods are not required in all versions. For instance, in some versions the upper connection member (418) may be configured without slots (420) for engaging with the projections (406) of the stud (404). In view of the teachings herein, other ways to connect the stud (404) with the upper connection member (418) to create a hermetic seal will be apparent to those of ordinary skill in the art.

As mentioned above, the base (318) includes the opening (324) that are configured to connect with the seal (326) such that the seal (326) contacts the base (318) along an underside surface of the base (318). Furthermore, the base (318) is configured to connect with a lower connection member (422) such that the lower connection member (422) contacts the base (318) along a top surface of the base (318). The seal (326) has an opening that receives portions of the valve assembly (400). More specifically, at an underside surface of the base (318), a stud (424) connects with the seal (326) and base (318). As viewable in FIG. 9, in the present example the stud (424) has projections (426) that engage with slots (332) of the seal (326), slots (334) of the base (318), and ultimately with a slot (428) of the lower connection member (422).

In some examples, the slots (332, 334, 428) and projections (426) are configured as alignment guides. In some other examples the projections (426) may be resiliently biased and have a hook feature at the end such that the projections (426) actively engage with the lower connection member (422) to make a more secure connection between the stud (424) and the lower connection member (422).

The stud (424) further comprises threaded portions (430) that, when the valve assembly (400) is assembled, extend through the opening in the seal (326) and through the opening (324) in the base (318). The threaded portions (430) are configured as multiple partial bores in the stud (424), with the bores having threads along their interior surface. The lower connection member (422) comprises threaded portions (432) that are configured to threadably engage with the threaded portions (430) of the stud (424). In this arrangement, the lower connection member (422) is positionable such that it contacts an interior of a lower surface of the base (318). In the present example, the threaded connection between the lower connection member (422) and the stud (424) is such that the threaded portions (430) and the threaded portions (432) engage when the lower connecting member (422) and the stud (424) are pressed together. In this manner the threads and recesses of each of the threaded portions (430) and the threaded portions (432) operate as interlocking teeth or ridges. Furthermore, the connection among the stud (424), the seal (326), the base (318), and the lower connection member (422) creates a hermetic seal.

While the present example illustrates multiple mechanical fastening methods to connect the stud (424) with the lower connection member (422), such multiple fastening methods are not required in all versions. For instance, in some versions the lower connection member (422) may be configured without slot (428) for engaging with the projections (426) of the stud (424). In view of the teachings herein, other ways to connect the stud (424) with the lower connection member (422) to create a hermetic seal will be apparent to those of ordinary skill in the art.

The stud (424) further comprises a low pressure inlet (434), a low pressure outlet (436), and a high pressure inlet (438). The low pressure inlet (434) of each stud (424) of each cell (302) connects with an inbound flow portion of a low pressure line (440). The low pressure outlet (436) of each cell (302) connects with an outbound flow portion of the low pressure line (441). The high pressure inlet (438) of each cell (302) connects with an inbound flow portion of a high pressure line (442).

Between the upper connection member (418) and the lower connection member (422) is a connection tube (444). The connection tube (444) extends through a bore (446) of the lower connection member (422) to ultimately connect with a bore (448) of the stud (424). At the other end of the connection tube (444), the connection tube (444) extends through a bore (450) of the upper connection member (418) to ultimately connect with a bore (452) of the stud (404). With the connection tube (444) in place, the gas from the high pressure line (442) is communicated to and through the connection tube (444) to ultimately be released from the pressure release assembly (408).

Surrounding the connection tube (444) is a spring (454). In the present example the spring (454) connects securely with the stud (404) at the top of the spring (454), and the spring (454) connects securely with the stud (424) at the base of the spring (454). With this configuration, the spring (454) acts as a brace to provide support to the connection tube (444). The spring (454) also acts as a brace to provide support to the cell (302) generally by maintaining a certain distance between the upper connection member (418) and the lower connection member (422) such that the cell (302) cannot collapse. In some versions, the spring (454) may be positioned between, and contact, the studs (404, 424) without requiring the spring (454) to be securely connected with the studs (404, 424).

Figure 10:
FIG. 10 illustrates a perspective view of a pressure valve of the cell of FIG. 6 in accordance with one or more embodiments described herein.
Figure 11:
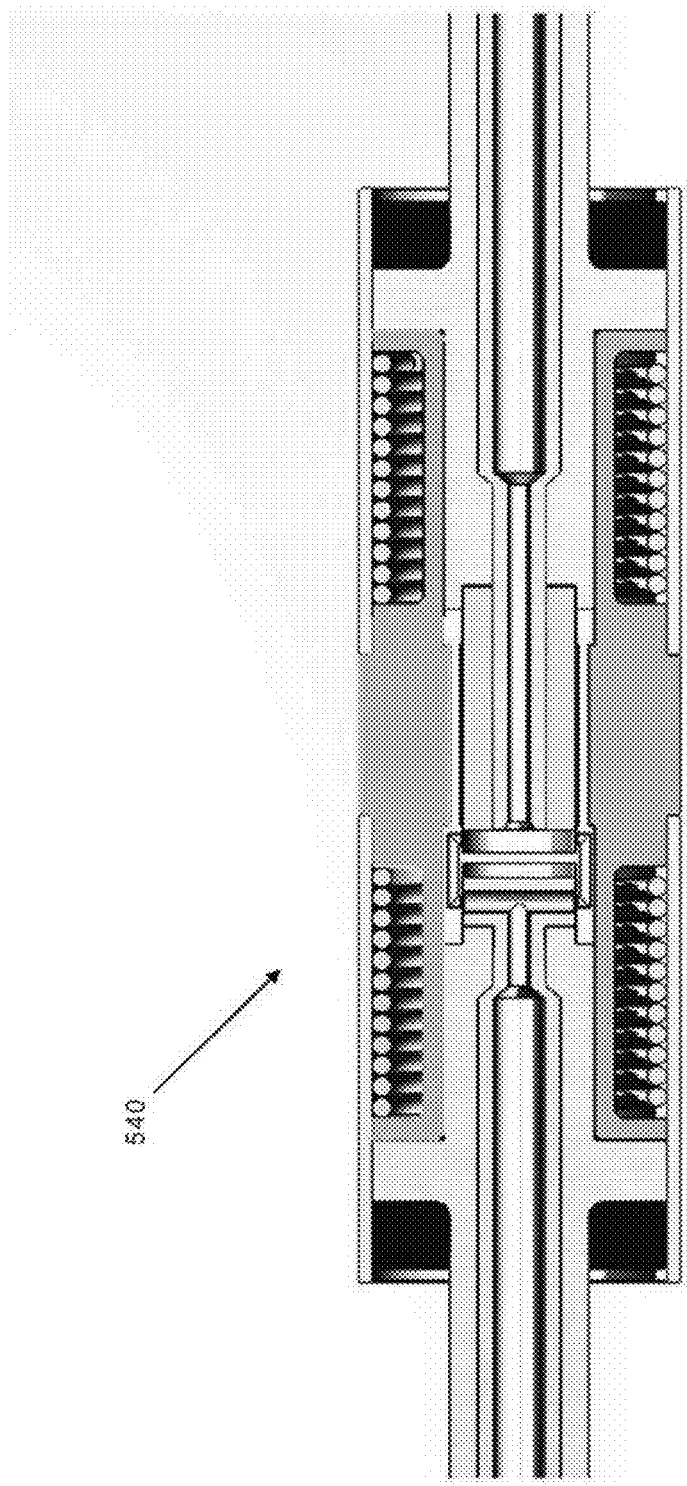
FIG. 11 illustrates a cross section view of the pressure valve of FIG. 10 in accordance with one or more embodiments described herein.
Figure 12:
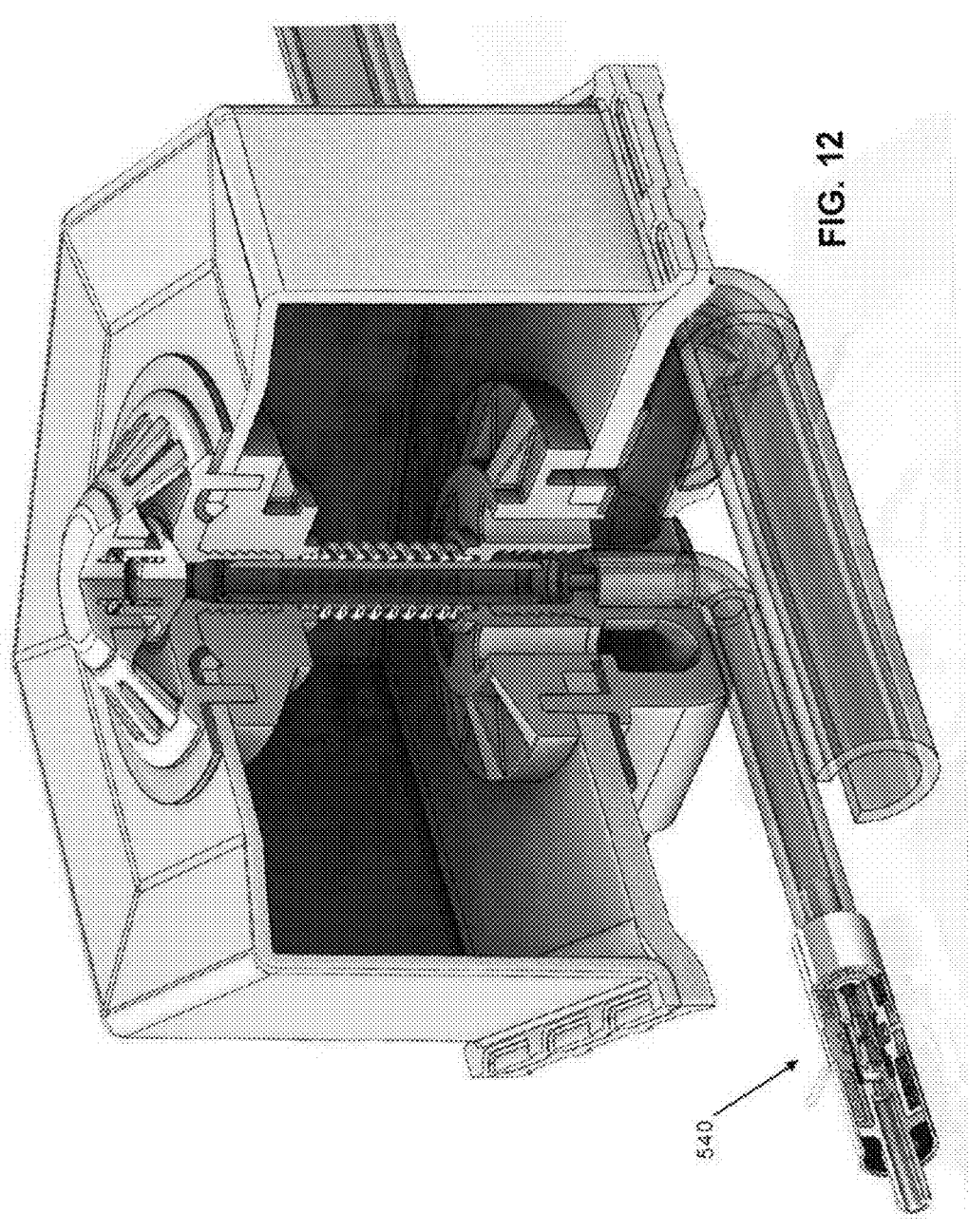
FIG. 12 illustrates a perspective view of the cell of FIG. 6, shown with portions of the cell, valve assembly, and pressure valve cut away to reveal internal components, and shown with the pressure valve positioned on the high pressure line outside of the cell in accordance with one or more embodiments described herein.
Figure 13:
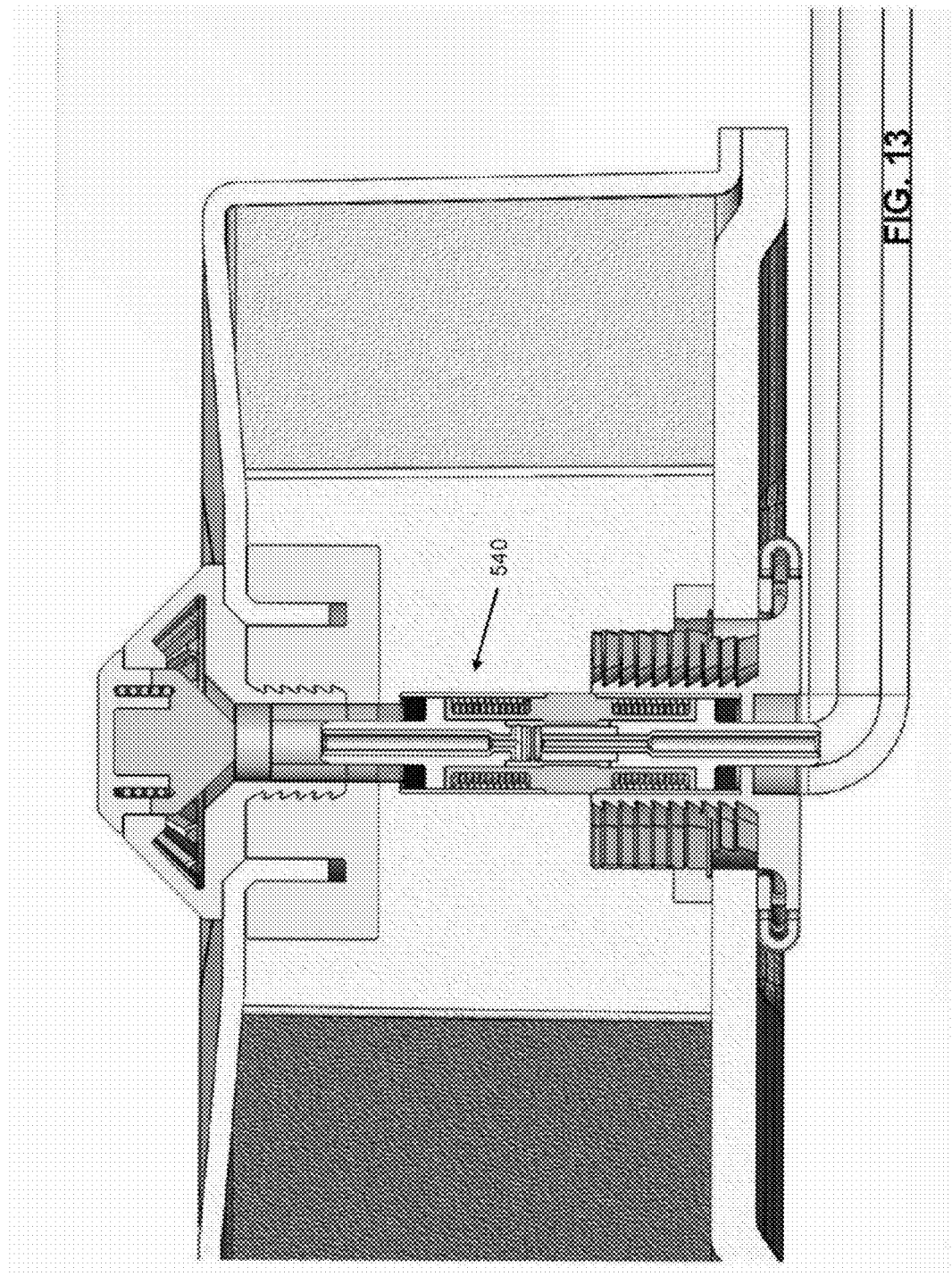
FIG. 13 illustrates a cross section view of an alternative exemplary cell usable with the helmet of FIG. 1, with the pressure valve positioned within the cell in accordance with one or more embodiments described herein.

FIGS. 7, 10, and 11 illustrate an exemplary pressure valve (540) for use with the helmet (10). In the present example, there are one or more pressure valves (540) in fluid communication with each of the cells (302). As shown in FIGS. 7 and 12, a first pressure valve (540) associated with the high pressure system (510) is connected with the high pressure line (442) that connects with cell (302). In this example, the pressure valve (540) is positioned in-line with the high pressure line (442) outside of the cell (302). In yet other versions, for instance as shown in FIG. 13, the pressure valve (540) associated with the high pressure system (510) can be positioned within the cell (302). In other versions, the high pressure line (442) extends from the high pressure inlet (438) of the stud (424) to the pressure chamber (530) and the pressure valve (540) is located within the pressure chamber (530) where it connects with the high pressure line (442). In view of the teachings herein, other configurations for connecting the pressure valve (540) with the high pressure line (442) so as to regulate gas flow through the high pressure line (442) will be apparent to those of ordinary skill in the art.

As mentioned above, the low pressure system (520) connects with each cell (302). In the present example, other pressure valves (540) connect with the low pressure inbound flow line (440), and yet other pressure valves (540) connect with the outbound low pressure flow line (441). While in some versions the pressure valves (540) may be the same design and configuration whether or not used with the high pressure system (510) or the low pressure system (520), in other versions the pressure valves used with each system (510, 520) may differ.

Similar to the high pressure line (442), for each cell (302), the low pressure lines (440, 441) extend from the low pressure inlet (434) and low pressure outlet (436) of the stud (424) respectively to the pressure chamber (530). In some versions, the pressure valves (540) that connect with the low pressure flow lines (440, 441) may be positioned in-line with the respective flow lines (440, 441) outside of the cell (302) and prior to the pressure chamber (530). In some other versions, the pressure valves are positioned within the pressure chamber (530) where they connect with their respective low pressure flow lines (440, 441). In view of the teachings herein, other configurations for connecting the pressure valves (540) with the low pressure lines (440, 441) so as to regulate gas flow through the low pressure lines (440, 441) and within the cells (302) will be apparent to those of ordinary skill.

As mentioned above, the gas delivery system (500) comprises the high pressure system (510), the low pressure system (520), and the pressure chamber (530). With the high pressure system (510), each of the high pressure lines (442) connect with the pressure chamber (530). With the low pressure system (520), each of the low pressure inbound flow lines (440) and each of the low pressure outbound flow lines (441) connect with the pressure chamber (530).

As discussed above, within each of the high pressure system (510) and the low pressure system (520), pressure valves (540) are used at select locations between the respective lines (442, 440, 441) and the pressure chamber (530). The pressure valves (540) are in electrical communication with the control system (600), such that the computer (606) controls the valve position within each of the pressure valves (540) to regulate the gas flow in a calculated manner as described further below. With the configurations described above, the pressure chamber (530) is configured to supply the gas, via the high pressure line (442), to the valve assembly (400) of each cell (302). Similarly, the pressure chamber (530) is configured to supply the gas, via the low pressure line (440), to each cell (302). Also, the pressure chamber (530) is configured to receive gas, via the low pressure line (441) of each cell (302).

In one version, each cell (302) of the helmet (10) connects to a dedicated high pressure line (442) and to a dedicated low pressure inbound flow line (440) and dedicated low pressure outbound flow line (441). In other versions, a single high pressure line (442) may connect to one or more cells (302) in series or parallel. Similarly, a single low pressure inbound flow line (440), and/or a single low pressure outbound flow line (441) may connect to one or more cells (302) in series or parallel. Based on the configuration used, the number of pressure valves (540) used can be adapted to provide for control of the gas delivery system (500) accordingly.

Figure 14:
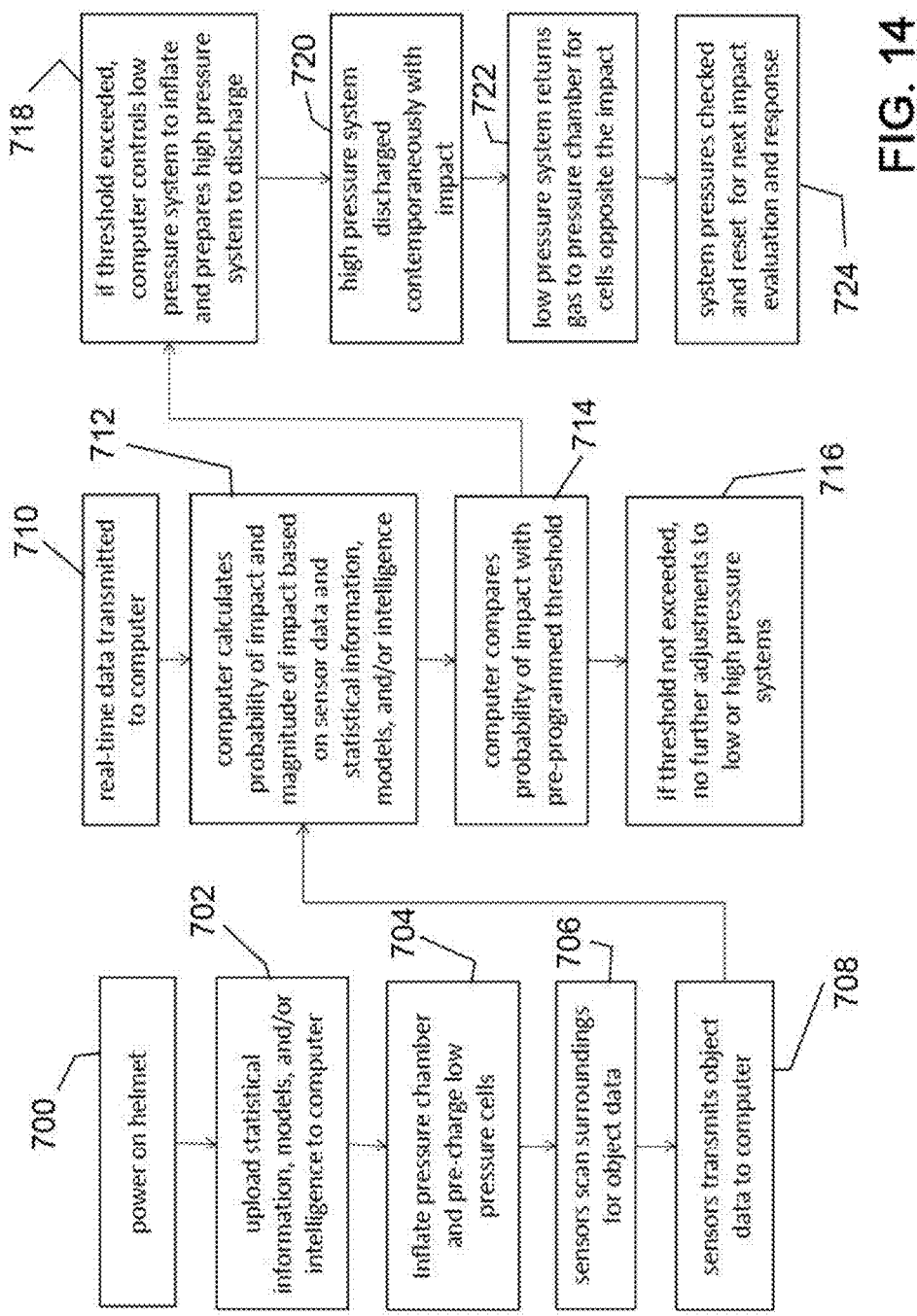
FIG. 14 illustrates a non-limiting exemplary set of steps used by the control system of the helmet of FIG. 1.

FIG. 14 depicts an exemplary set of steps for use with the helmet (10) in the context of a football game. Before the helmets are used in the game, the helmets (10) are powered on (700) so the computers (606) can be updated with various algorithms based on statistical information, statistical models, and/or artificial intelligence related to the game. For example, data from past football games can be collected and mined to develop algorithms that relate to the probability of an impact for a particular player, or between or among players, based on their position on the field, their role (e.g. quarterback, running back, tight end, etc.), the offensive or defensive schemes or plays used, the time remaining in the game, etc. In view of the teachings herein, various algorithms that may be used will be apparent to those of ordinary skill in the art.

With this information, the computer (606) can be updated by uploading (702) these algorithms to the computer readable medium (610). In this example, these uploaded algorithms can later be used as the basis for the computer (606) calculating the probability of an impact.

When making the updates concerning the algorithms based on past game data, this information can be uploaded to the computer (606) wirelessly using the network adapter (612) or other wireless network communication technologies including, but not limited to, Bluetooth and/or NFC. Of course this information may be uploaded using a wired connection instead of or in addition to wireless communication technology. For instance, the network adapter (612) may support a wired connection instead of or in addition to a wireless connection. In such an example using a wired connection the computer (606) can include one or more accessible ports (e.g., a USB port, a SD media slot, RJ-45, etc.) that are configured to connect with data cables or removable memory devices.

With the computer (606) updated with the desired information, before putting the helmets (10) into play, the pressure chambers (530) of each helmet are checked for inflation pressure and inflated if necessary (704). The pressure chambers (530) are each fitted with a pressure valve (not shown) that allows the pressure chamber (530) to be inflated or deflated as needed. In some versions, the pressure valve of the pressure chamber (530) is accessible from the outside of the helmet (10) such that a player wearing the helmet need not remove the helmet to inflate or recharge the pressure chamber (530). Also before the helmet (10) is put into play, the plurality of cells (302) are inflated to about 85% of their maximum capacity (704).

In view of the teachings herein, other maximum and initial inflation pressures that may be used for the plurality of cells (302) will be apparent to those of ordinary skill in the art. In the present example, this initial inflation of 85% of the maximum capacity is maintained throughout the game, yet adjusted to be greater if called for based on the computer's (606) calculation as will be described further below.

By inflating the plurality of cells (302) to this initial and constant target pressure mentioned above that is 85% of the maximum capacity, the response time is shortened in those instances where the system calls for a pressure change in the plurality of cells (302) to be something greater than or less than the 85% of maximum capacity.

In the present example, the maximum capacity of the low pressure plurality of cells (302) is designed such that 85% of that maximum capacity provides adequate pressure within the cells (302) to absorb the normal impact hits that occurs regularly during the game. These normal impact hits can be understood to be those hits that have an impact energy beneath a threshold where a concussion is likely to occur from a hit in the absence of some other mitigating protective action. By way of example only, and not limitation, in one calculation it may be determined that the minimum energy from an impact where a concussion is likely to result is where the energy is equal to or exceeds a value in newton meters. In some scenario's, 85% of the maximum capacity of the low pressure cells (302) would be set at an appropriate newton per square meter value.

With the helmets (10) uploaded with current algorithms that provide the native intelligence of the design of the game, and with the pressure chambers (530) fully inflated and the low pressure cells (302) inflated to their target of 85% of maximum as described above, the helmets (10) are ready to be put into play. On the field in use, the sensors (602) scan the surroundings (706), collecting and generating data. More specifically, the sensors (602) identify the motion of surrounding objects, i.e. other players on the field, in terms of speed and direction. Additionally, the sensors (602) detect the size of the objects in motion. This size, direction, and speed data of the objects is at times herein referred to as the "object data." The object data collected by the sensors (602) is transmitted to the computer (606) (708).

In some versions and exemplary uses, the helmet (10) allows for real-time data to be input into the computer (606) (710) in addition to the object data from the sensors (602). For instance, this occurs through transmitting the real-time data to the computers (606) of the helmets (10) using the network adapters (612) of each helmet (10). For example, real-time data like play calls or offensive or defensive schemes can be transmitted to the computers (606). While such real-time data can be used, it is not required in all example uses of the helmets (10).

With the object data as well as the optional real-time data, the computer (606) calculates the probability of an impact to the helmet (10) as well as the magnitude of that impact (712). In one example, the object data and/or real-time data may be used as inputs to variables in one or more of the algorithms previously uploaded to the computer (606) to determine the probability and magnitude of impact by one or more of the objects. In some versions, the object data and/or real-time data is not required to be an input to any of the algorithms previously uploaded to the computer (606). In such cases the object data and/or real-time data may be evaluated independently and compared to one or more of the statistical information, statistical models, and/or other intelligence of the game, which may include, but is not required to include, one or more algorithms.

The calculated probability and magnitude of impact, is then compared with a pre-programmed threshold for probability and/or magnitude of impact (714). If the calculated probability and/or magnitude of impact does not exceed the pre-programmed threshold, then the gas delivery system (500) does not act (716), and the inflation of the low pressure cells (302) as described above provides the protection for any impact that may occur. If the calculated probability of impact exceeds the pre-programmed threshold for probability of impact then the gas delivery system (500) is controlled to anticipate the impact and counteract the impact (718).

In some examples, whether or not the gas delivery system (500) is controlled to anticipate the impact and counteract the impact can be based on a combination of the probability of the impact combined with the magnitude of the impact, rather than just the probability of impact alone. For example, the gas delivery system (500) may take action in a scenario where the calculated probability of impact is lower, but the calculated magnitude of impact is above a concussion causing level.

In view of the teachings herein, other ways to control the gas delivery system (500) to take action to counteract an impact based on the calculated probability of impact and magnitude of that impact compared to pre-programmed thresholds will be apparent to those of ordinary skill in the art.

In the scenario where the pre-programmed threshold for probability of impact and/or magnitude of impact is exceeded, the computer (606) controls the gas delivery system (500) so that before the release of gas through the high pressure system (510), a number of low pressure cells (302) that surround the anticipated impact location are further inflated. This further inflation is to counter the energy that will be released from the valve assemblies (400) by way of the high pressure system (510), but this counter of energy is done over a greater surface area. In the present example, the increase in the energy in these cells (302) is such that the cumulative energy in these cells (302) matches the energy that will be released from the valve assembly (400) by way of the high pressure system (510).

By way of further example, and not limitation, based on the object data from the sensors (602) the location of the predicted impact is known. For instance, the particular cell or cells (302) where the impact will occur is identified. This can be referred to as the "impact location." With this information, those cells (302) that are positioned at and around the impact location are further inflated. In the present example, those low pressure cells (302) that are further inflated encompass those cells (302) around and including the impact location extending in a concentric fashion to cover about half of the surface area of the protective layer (300). In other words, the further inflated cells (302) encompass about 180 degrees around the helmet (10). So for example, if the impact location was determined to be in the center of the right side of the helmet (10), all those cells (302) on the right side half of the helmet (10) would be further inflated.

In the present example, the amount of further inflation for the low pressure cells (302) is calculated such that the cumulative energy of those cells (302) further inflated is about equal to the energy calculated to be released through the one or more valve assemblies by the high pressure system (510) as will be described below. By way of example only, and not limitation, in a helmet (10) having seventy cells (302) in total where half of the cells (302) would further inflate based on an anticipated impact, the energy within each of the thirty-five further inflated cells (302) is summed to arrive at the cumulative energy, which is configured to match that energy to be released from the one or more valve assemblies (400) by the high pressure system (510) to counteract the anticipated energy of the impact. So, if one valve assembly (400) is to release 1,000 newton meters of energy, the cumulative energy in the surrounding thirty-five cells (302) should equal about 1,000 newton meters, which would equate to each of those thirty-five cells (302) having an energy of about 28.5 newton meters.

At about the same time as the control system (600) is further inflating certain low pressure cells (302), the control system (600) is preparing the high pressure system (510) (718). The purpose of the high pressure system (510) is to release an equal amount of energy in the specific location of the anticipated impact at the time of the impact. To do this, the high pressure system (510), at the time of the impact, releases an amount of gas calculated to counter the energy of the anticipated impact (720).

Based on the identified impact location as discussed above, the control system (600) selects which one or more valve assemblies (400) from the respective one or more cells (302) to prepare for use by the high pressure system (510). For example, based on the information input into the computer (606) as described above, the energy of the anticipated impact is calculated. In some versions this energy may be calculated as the kinetic energy of the object using the equation $E=\frac{1}{2} \times m \times v^2$, where E is energy in newton meters, m is the object's mass in kilograms, and v is the object's velocity in meters per second.

With the energy of the impact calculated, the computer (606) calculates the amount of air to send from the pressure chamber (530) to the valve assembly (400) such that when the air is released from the valve assembly (400) an amount of energy is released that matches the calculated energy of the impact.

To account for blow-by and any other losses generally, in the present example the control system (600) controls the high pressure system (510) such that 120% of the calculated energy from the impact is used to calculate the amount of air to send from the pressure chamber (530) to the valve assembly (400). With the amount of air determined, the control system (600) opens and closes those valves (540) necessary to provide the air amount from the pressure chamber (530) to the valve assembly (400). At the time of the projected impact, the control system (600) controls the valve assembly to move the plunger (414) from a closed position as shown in FIG. 8, to an open position as shown in FIG. 9, to release the gas and the energy to oppose the energy from the impact (720).

Also in the present example, on the side of the helmet (10) opposite of where the impact occurs, the control system (600) directs a low pressure release of gas from the remainder of the cells (302) that were not further inflated as described above. The gas released from these cells (302) uses the outbound flow low pressure line (441) to send gas from the cells (302) back to the pressure chamber (530). Providing for this opposite side release of pressure aides in buffering the motion effect to stabilize the cranium to helmet (10) overall positioning.

After the high pressure system (510) has discharged, the control system (600) checks the gas delivery system (500) pressures and makes adjusts if needed to return the helmet (10) to an initial state where the plurality of cells (302) of the protection layer (300) are inflated to about 85% of their maximum capacity (722). At this point the control system (600) repeats the impact evaluation process shown in FIG. 14 beginning with the sensors (602) scanning the surroundings for object data (706).

To continually improve anticipation of impacts, data captured during a game from each helmet (10) is analyzed. The computer (606) may be configured to store data in the computer readable medium (610) about the functions of the helmet (10) during the game. This data may be retrieved from each helmet (10) and used individually and collectively with artificial intelligence or other modeling techniques to make adjustments to the algorithms and/or calculations used with the helmet (10) to determine impact probability and magnitude. Where such improvements are made, updates can be uploaded to the helmets (10) before the next use (702).

While the above example is set in a sporting example, and in particular a football game, the helmet (10) can have many other applications that will be apparent to those of ordinary skill in the art in view of the teachings herein. These other applications may include, among other things, other sports, military environments, or various employment jobsites like construction, etc. In view of the teachings herein, those of ordinary skill in the art will understand how to configure the impact probability determination and appropriate response anticipating an impact in such other applications as noted above and otherwise.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

For simplicity of explanation, any computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, various aspects and features of the helmet are performed by components executed by a processor established from a combination of electrical and mechanical components and circuitry, a human is unable to replicate or perform the subject data packet configuration and/or the subject communication between processing components and/or a determination component. Furthermore, helmet data associated with activity related to the helmet or user can be generated, transformed, and mapped to other systems. The access to such helmet data is accessed from a memory where such access patterns a human are unable to replicate.

Also, the systems and methods disclosed herein can be integrated with the tangible and physical systems of helmets and helmet hardware and other such physical helmet components. Furthermore, the generation of data associated with a helmet system cannot be performed by a human. For example, a human is unable to generate learned data from a helmet and helmet user activities vehicle, and utilize a personalized preference of one or more users, accurately and precisely sense environmental conditions. Furthermore, a human is unable to communicate helmet data and/or packetized data for communication between a main processor (e.g., using a processor) and a memory.

Figure 15:
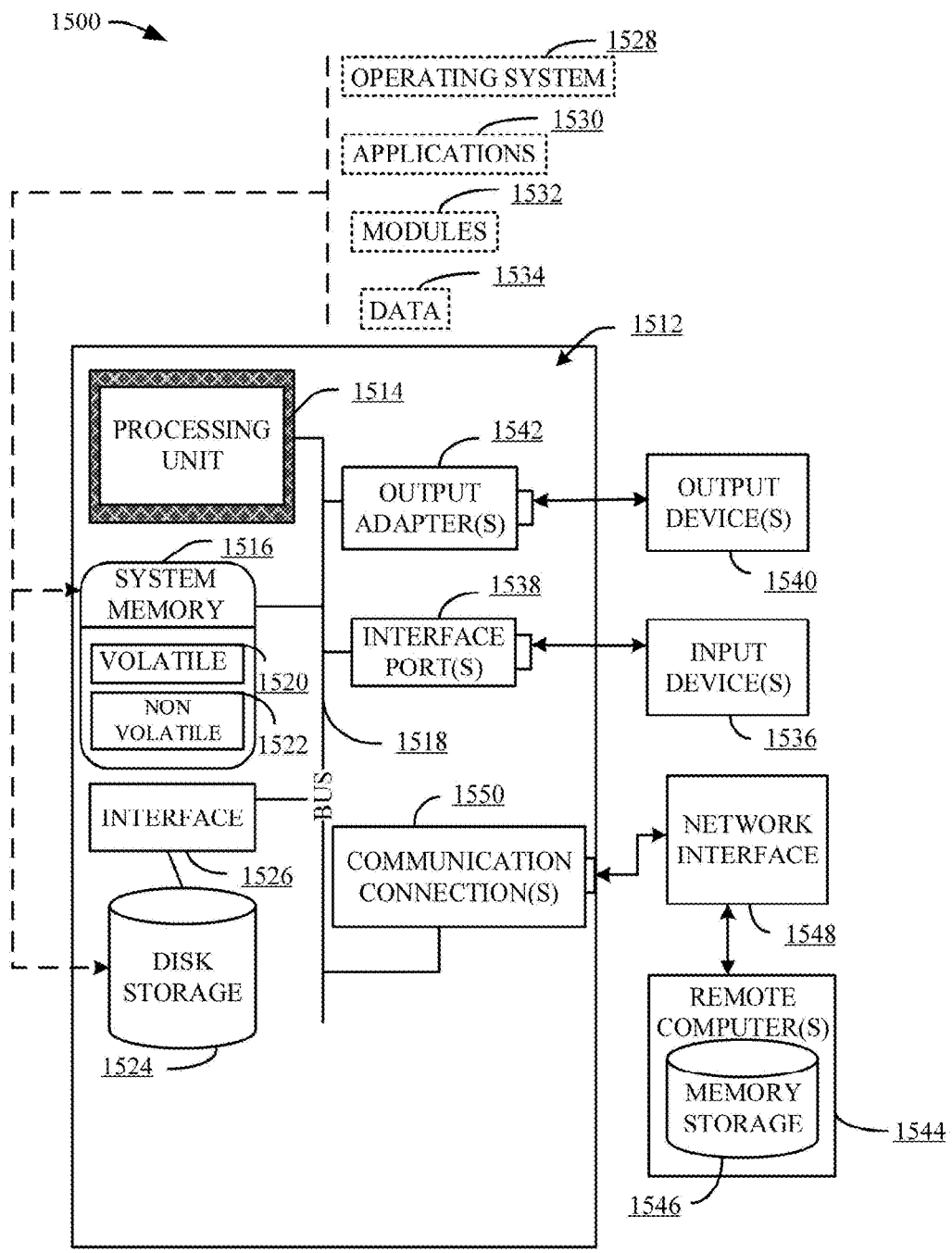
FIG. 15 illustrates a block diagram of an example, non-limiting system and network environment in which one or more embodiments described herein can be facilitated.

In order to provide a context for the various aspects of the disclosed subject matter, FIG. 15 as well as the following discussion is intended to provide a general description of a suitable environment in which the various aspects of the disclosed subject matter can be implemented. FIG. 15 illustrates a block diagram of an example, non-limiting operating environment in which one or more embodiments described herein can be facilitated. With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/nonvolatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising a processor, coupled to a memory, that executes or facilitates execution of one or more executable components, comprising:

a helmet element comprising an outer shell layer and an interior protective layer, wherein the interior protective layer comprises a set of inflatable cells;

a gas delivery system configured to adjust a pressure condition within a first subset of inflatable cells of the set of inflatable cells, wherein a first set of high pressure valves and a second set of low pressure valves of the gas delivery system are connected to a set of high pressure lines and low pressure lines respectively that connect to base portions of the set of inflatable cells via first stud members connected to the base portions, wherein the gas delivery system further comprises:

a high pressure system comprising the set of high pressure lines connected to the set of inflatable cells and the first set of valves, wherein the high pressure system is configured to deliver a high pressure gas flow through a subset of high pressure lines via a first subset of valve members and into the first subset of inflatable cells based on a predicted impact location;

a low pressure system comprising the set of low pressure lines connected to the set of inflatable cells and the second set of valves, wherein the low pressure system is configured to deliver a low pressure gas flow through a subset of low pressure lines via a second subset of valve members and into a second subset of inflatable cells based on a surrounding region of the predicted impact location, wherein the surrounding region covers a greater surface area of the interior protective layer than the predicted impact location; and a control system configured to control a position of the first subset of valves and the second subset of valves of the gas delivery system, a regulation of a gas flow within the first set of valves and the second set of valves based on the position, and one or more sensors embedded within the helmet element, wherein the one or more sensors are configured to detect a set of data associated with an environment of the device.

2. The device of claim 1, further comprising low pressure inflatable cells represented by the second subset of inflatable cells and high pressure inflatable cells represented by the first subset of inflatable cells, wherein the low pressure inflatable cells inflate at a first cumulative energy level that is approximately a same level as a second cumulative energy level of the subset of high pressure inflatable cells, and wherein a number of low pressure inflatable cells is greater than a number of high pressure inflatable cells of the subset of high pressure inflatable cells.

3. The device of claim 1, further comprising a power supply element configured to supply power to the control system.

4. The device of claim 1, wherein the set of data comprises at least one of object data associated with at least one object surrounding the device, motion data associated with the at least one object surrounding the device, speed data associated with the at least one object surrounding the device, directional data associated with the at least one object surrounding the device, laser detection data associated with a motion of the at least one object surrounding the device, image data associated with the at least one object surrounding the device, or artificial intelligence data corresponding to a probability of impact for a respective user profile.

5. The device of claim 1, further comprising a global positioning satellite module configured to receive location data associated with another device.

6. The device of claim 1, further comprising vent assemblies of the set of inflatable cells, wherein a vent assembly comprises a second stud interfacing with a top opening of an inflatable cell and a pressure release assembly comprising a vent cap, a spring member, and a plunger element, wherein the second stud comprises angled slots to release gas in a dispersed manner based upon an open position of the plunger element.

7. The device of claim 1, wherein the high pressure system is capable of introducing a first level of pressure that is greater than a first current state of pressure into the first subset of inflatable cells from a pressure chamber based on a first set of instructions from the processor in connection with the control system.

8. The device of claim 7, wherein the low pressure system is capable of evacuating a second level of pressure that is less than a second current state of pressure from the first subset of inflatable cells based on a second set of instructions from the processor in connection with the control system.

9. The device of claim 6, wherein the vent assembly is configured to facilitate an increase or decrease in pressure within the first subset of inflatable cells in connection with the high pressure system and the low pressure system respectively.

10. The device of claim 1, wherein the set of inflatable cells comprise an upper connection member, a lower connection member, and a connection tube to facilitate a containment of pressure within or a release of pressure outward of the inflatable cell.

11. A system comprising
a memory that stores computer executable components;
a processor that executes the computer executable components stored in the memory, wherein the computer executable components comprise:
a gas delivery component configured to adjust a pressure condition within a set of inflatable cells of a helmet device, wherein high pressure lines and a low pressure lines connected to a set of valve members of the gas delivery component, connect the set of inflatable cells to the gas delivery component via the high pressure lines and the low pressure lines, wherein the gas delivery component further comprises:
a high pressure system configured to deliver a high pressure gas flow via high pressure valves of the set of valve members, through a subset of high pressure lines into first body portions of a first subset of inflatable cells based on a predicted impact location to the helmet device;
a low pressure system configured to deliver a low pressure gas flow via low pressure valves of the set of valve members, through a subset of low pressure lines into second body portions of a second subset of inflatable cells that encircle the first subset of inflatable cells based on surrounding region of the predicted impact location; and
a control component configured to control a position of the high pressure valves and the low pressure valves of the gas delivery system, a regulation of gas flow within the high pressure valves, and one or more sensors embedded within the helmet element, wherein the one or more sensors configured to detect a set of data associated with an environment of the helmet device.

12. The system of claim 11, further comprising a high pressure component, of the high pressure system, configured to introduce a first level of pressure that is greater than a first current state of pressure into the first subset of inflatable cells based on a first set of instructions received from the processor in connection with the control component.

13. The system of claim 12, further comprising a low pressure component, of the low pressure system, configured to evacuate a second level of pressure that is greater than a first current state of pressure from the first subset of inflatable cells based on a second set of instructions received from the processor in connection with the control component.

14. The system of claim 12, further comprising a vent assembly component configured to facilitate an increase or decrease in pressure within the first subset of inflatable cells based on a second set of instructions received from the processor in connection with the control component.

15. A computer-implemented method, comprising:
receiving, by a system operatively coupled to a processor, a set of data detected by one or more sensors embedded within a helmet device;
controlling a first position of a first set of valves connected to a set of high pressure lines connected to a first set of inflatable cells of the helmet device based on determined insights from the set of data and a predicted impact location;
controlling a second position of a second set of valves connected to a set of low pressure lines connected to a second set of inflatable cells of the helmet device based on a predicted region surrounding the predicted impact location, wherein the surrounding region covers a greater surface area than the predicted impact location;

delivering, by the system, a volume of gas to deliver within the first set of inflatable cells and the second set of inflatable cells of the helmet device based on the set of data, the predicted impact location, and the predicted region surrounding the predicted impact location.

16. The computer-implemented method of claim 15, further comprising introducing, by the system, a first level of pressure that is greater than a first current state of pressure into the first set of inflatable cells based on a first set of instructions received from the processor.

17. The computer-implemented method of claim 16, further comprising evacuating, by the system, a second level of pressure that is less than a second current state of pressure from the first set of inflatable cells based on a second set of instructions received from the processor.

18. The computer-implemented method of claim 15, further comprising receiving, by the system, location data associated with another helmet device.

19. The computer-implemented method of claim 15, further comprising supplying, by the system, power to the helmet device.

20. The computer-implemented method of claim 15, further comprising facilitating, by the system, a containment of pressure within or a release of pressure out of the first set of inflatable cells.

* * * * *